United States Patent [19]
Janda

[11] 3,834,038
[45] Sept. 10, 1974

[54] METHOD FOR DRYING MOLDABLE RESINS

[75] Inventor: Robert J. Janda, Sterling, Va.

[73] Assignee: Gammaflux, Inc., Reston, Va.

[22] Filed: Sept. 14, 1972

[21] Appl. No.: 288,941

[52] U.S. Cl.................................. 34/1, 219/10.55
[51] Int. Cl.............................................. F26b 3/32
[58] Field of Search.......... 34/1; 219/10.55; 264/26, 264/DIG. 46

[56] References Cited
UNITED STATES PATENTS

| | | | |
|---|---|---|---|
| 2,459,225 | 1/1949 | Hickok | 264/DIG. 46 |
| 2,497,670 | 2/1950 | Hanson et al. | 219/10.55 |
| 2,513,991 | 7/1950 | Bradbury | 34/1 |
| 2,536,676 | 1/1951 | Brown et al. | 34/1 |
| 2,555,450 | 6/1951 | Lee | 264/DIG. 46 |
| 3,048,928 | 8/1962 | Copson et al. | 34/1 |
| 3,253,344 | 5/1966 | Van Belder | 34/1 |
| 3,434,220 | 3/1969 | Forster | 34/1 |
| 3,605,272 | 9/1971 | Boucher | 34/1 |
| 3,640,913 | 2/1972 | Cerra | 264/26 |
| 3,673,288 | 6/1972 | Childs | 264/26 |
| 3,737,488 | 6/1973 | Porter et al. | 264/DIG. 46 |

Primary Examiner—John J. Camby
Assistant Examiner—Paul Devinsky
Attorney, Agent, or Firm—Barry John Nace

[57] ABSTRACT

A method of drying plastic resins through the use of microwave energy in a partial vacuum is disclosed. The method is particularly useful for drying plastic resins which are to be molded by an injection molding process. Further, a particular embodiment of apparatus which provides the microwave-partial vacuum drying is disclosed herein.

8 Claims, 2 Drawing Figures

3,834,038

METHOD FOR DRYING MOLDABLE RESINS

BACKGROUND OF THE INVENTION

1. Field of the Invention

This invention is related to the plastic resins industry and is particularly concerned with a method of drying plastic at a rapid rate so as to more rapidly prepare the plastic resin for use in a molding, particularly injection molding type, process and apparatus associated therewith.

2. Description of the Prior Art

Heretofore it has been customary to heat plastic resins which are to be used in molding processes by the use of hot dry air in order to remove moisture from resins. However, such is time consuming as the plastic must be heated at a carefully chosen rate in order to prevent the plastic resin from melting and thereby becoming undesirable for the molding process. Further, it is necessary that the moisture within the resinous particles be removed in order to obtain high quality products and prevent corrosion of the apparatus used. Therefore, extensive drying periods wherein moderately low temperatures, i.e., below 250° F, were heretofore necessary.

Today extensive use is made of molded plastic articles such as interiors for automobiles, furniture, novelty items and the like. It is economically necessary to make these items as rapidly as possible.

Therefore, the present methods of molding plastic resins are not totally acceptable in view of the necessity of the extensive drying periods which are necessary to heat the plastic resins at a temperature sufficiently low to prevent a melting of the resin.

OBJECTS OF THE INVENTION

It is, accordingly, an object of this invention to present a method of drying plastic resins which are to be used in a molding process.

It is more particularly an object of this invention to describe a method of drying plastic resins using both microwave energy and a partial vacuum.

It is a further object of this invention to describe apparatus utilizing microwave energy and a partial vacuum in order to more quickly and efficiently dry plastic resins which are to be used in a molding process.

It is a still further object of this invention to describe an improvement in a process for molding plastic resins.

It is yet a further object of this invention to reduce the oxidation of resins which generally takes place during a molding process.

Other objects of this invention will be obvious to those skilled in the art as the description of this invention proceeds.

BRIEF SUMMARY OF THE INVENTION

The present invention, including both the method and apparatus utilized in the method described, provides a means of removing moisture from plastic resins which are to be molded by the use of microwave energy in a partial vacuum in as little as only one-tenth of the time necessary when well-known conventional methods are used to dry resins. The plastic resins are thereby dried at a rapid rate and the moisture content of the resins is lowered to a percentage which is acceptable to the industry at a fast rate, which thereby enables the molding process to take place faster, and therefore, more economically.

Further, the present invention provides faster drying of the resins, provides a high production rate of drying and makes it possible to reduce the necessary physical size of the oven as the period of time within the oven is reduced. Further, no dessicant is needed and there is more uniformity in drying when a dessicant is not used as portions of a dessicant bed loses its effectiveness after saturation.

DETAILED DESCRIPTION OF THE INVENTION

Figure 1:
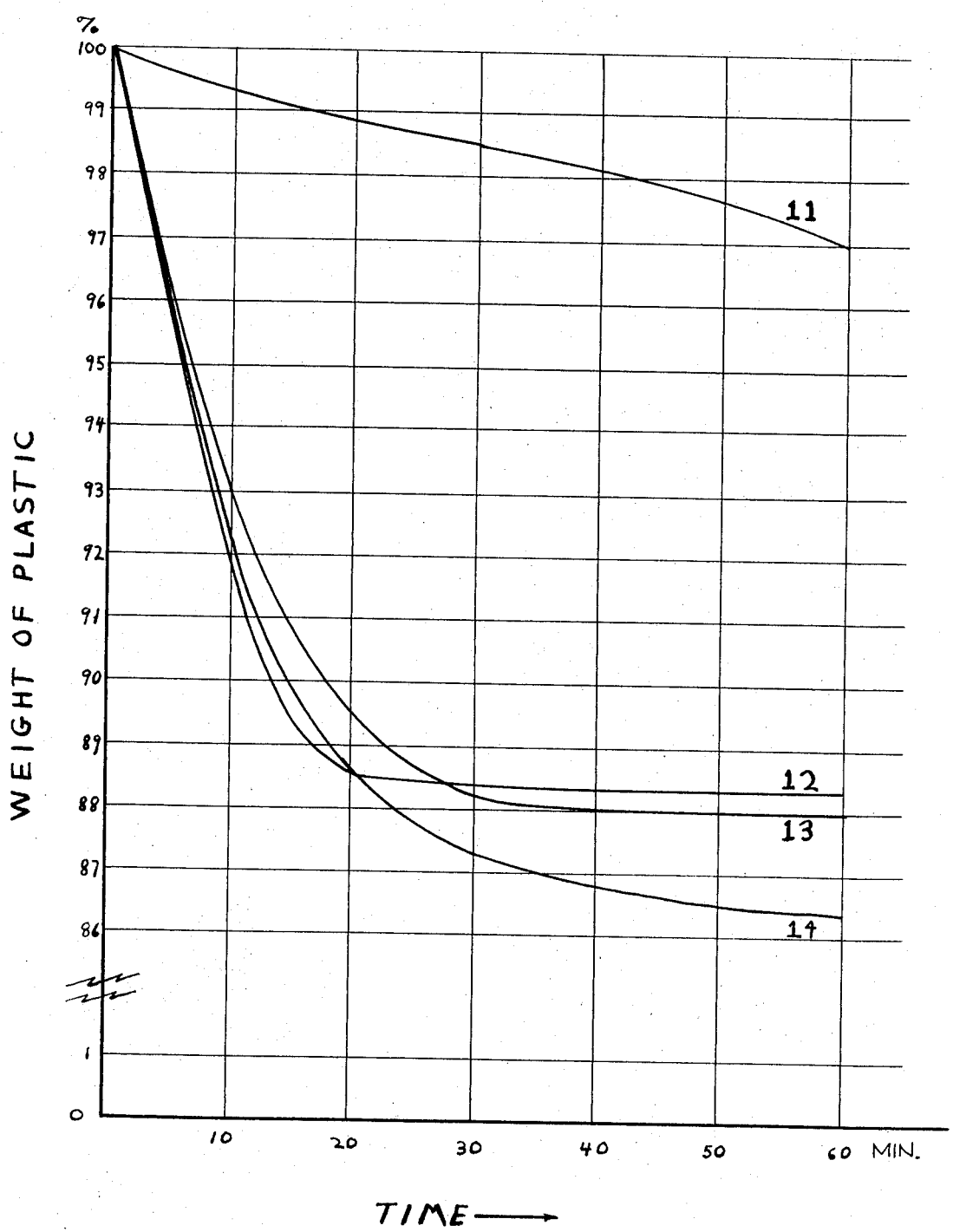
FIGS. 1 and 2 are diagrams which show the improvement which is obtained when the method of this invention is followed.

By the method of this invention water molecules are "vibrated-out" of plastic resins when the resins are exposed to microwave energy which is tuned to affect only water, and not the plastic resin, in a partial vacuum. It is preferable that the particular frequency of the microwaves is in the range of about 2,400 to 2,500 megahertz and that the partial vacuum preferably be about one-tenth or less atmosphere, or more preferably less than about 20 in. of $H_2O$.

By using the method of this invention it is possible to increase the molecular temperature of the moisture to as great as about 700° F without causing the resin to melt. Heretofore about 250° F was the highest temperature which could be used when removing moisture from a resin which was to be used in a molding process.

Since plastic resins are essentially transparent to microwave energy and water strongly absorbs radiation, it has been found that surface moisture or water, will quickly heat up to the point where it will diffuse more rapidly through the resin which is also being heated as a result of the microwave interaction with the contained water.

It has been found however, that if the method takes place in a closed container having an atmospheric pressure of one or more that the vaporized moisture is raised in temperature by the microwave energy until the plastic resin melts. Thus, it is necessary to conduct the method in a partial vacuum so that the temperature of the plastic resin is kept below its melting point as a result of the lower vapor pressure and removal of the free vapor before it can be further heated.

It is to be understood that the method of this invention is directed to removing moisture from any plastic resin which is capable of being molded, especially by an injection molding process. Typically, plastics should only contain moisture as shown in following TABLE 1 wherein heretofore used drying temperature are shown.

TABLE 1

| PERCENTAGE BY WEIGHT OF PERMISSIBLE MOISTURE | | | |
|---|---|---|---|
| Material | Injection | Extrusion | Drying Temperature |
| ABS RESIN | .10–.20 | .03–.05 | 170–190°F |
| ACRYLIC | .02–.10 | .02–.04 | 160–180°F |
| CELLULOSICS | Max. .40 | Max. .30 | 150–190°F |
| ETHYL CELLULOSE | .10 | .04 | 170–190°F |
| NYLON | .04–.08 | .02–.06 | 160°F |
| POLYCARBONATE | Max. .02 | .02 | 250°F |
| POLYETHYLENE, Low Density | .05–.10 | .03–.05 | 160–175°F |
| POLYETHYLENE, High Density | .05–.10 | .03–.05 | 160–220°F |
| POLYPROPYLENE | .05 | .03–.10 | 160–200°F |
| POLYSTYRENE | .10 | .04 | 160–180°F |
| VINYL | .08 | .08 | 140–190°F |

However, for purposes of simplicity, reference will be made throughout this disclosure to an "ABS" resin. Such a plastic resin is well-known throughout the industry and is typically used in testing methods for molding resins. The "ABS" resin is a mixture of acrylic, butylenic and styrene resins which is typically commercially available from Marbon Division of Borg-Warner Corp.

FUrther, in order to adequately test the method of this invention an electric microwave oven assembled from a Model GD-29 Heathkit was used. The assembled oven had the following specifications:

| | |
|---|---|
| Power Output | 650 watts minimum at 120 volts ac, 60 Hz |
| Power Requirement | 105–125 volts ac, 60 Hz, 15 amperes |
| Frequency | 2450 MHz ± 50 MHz |
| Microwave Leakage | 1 mW/cm² or less |
| Magnetron tube | Litton Industries, type L-5201 |
| Stirrer | 3 blade, rotates at about 65 rpm |
| Interlocks | Door guide microswitch, door latch switch |
| Timer | 0–35 minutes range, split scale 0–5 minutes in one-minute steps 5–35 minutes in five-minute steps |
| Cooling | Forced air |
| Oven Lamp | Fluorescent type F8T5/WW |
| Cooking Space | 7-15/16" high including glass tray 15½" wide 14" deep |
| Outside dimensions | 15⅛" high 25½" wide 14¾" deep (15 13/16" including handle |
| Weight | 75 lbs. |

It is not intended that the method of this invention is to be in any way limited to the thus described apparatus as other apparatus having the same function can be used in the method and a preferable embodiment will be described herein.

Further, it will be clear to those skilled in the art that the method and apparatus of this invention are useful in molding any well-known resins and not jsut the conveniently used herein "ABS" resin. Polyethylene, polyvinyl chloride, polybutylenes, polystyrenes, polyvinyl acetates, those set forth in Table 1, and the like are typical of the resins which can be more quickly used following the process of this invention.

Referring now to FIG. 1, it can be seen that when a conventional oven having a temperature of about 180° F is used to dry an "ABS" resin in 30 minutes the sample has lost 11.6 percent of its weight as moisture. After 60 minutes no additional moisture has been removed. Slightly better results are obtained when another sample is subjected to microwave energy having a frequency of 2,450 ± 50 MHz. However, when a microwave oven having a frequency of 2,450 ± 50 MHz is used with a partial vacuum of about 20 in H₂O, superior results are obtained. After only 20 minutes 11.4 percent of the weight of the resin has been removed as moisture, after 30 minutes 12.7 percent of the weight of the resin has been removed as moisture, and after 60 minutes 13.5 percent of the weight of the resin has been removed as moisture. It can also be seen that when only a vacuum was used poor results were obtained. Clearly, the use of microwave energy tuned to affect only the moisture and a partial vacuum produces a more rapid removal of moisture from the plastic resin.

Figure 2:
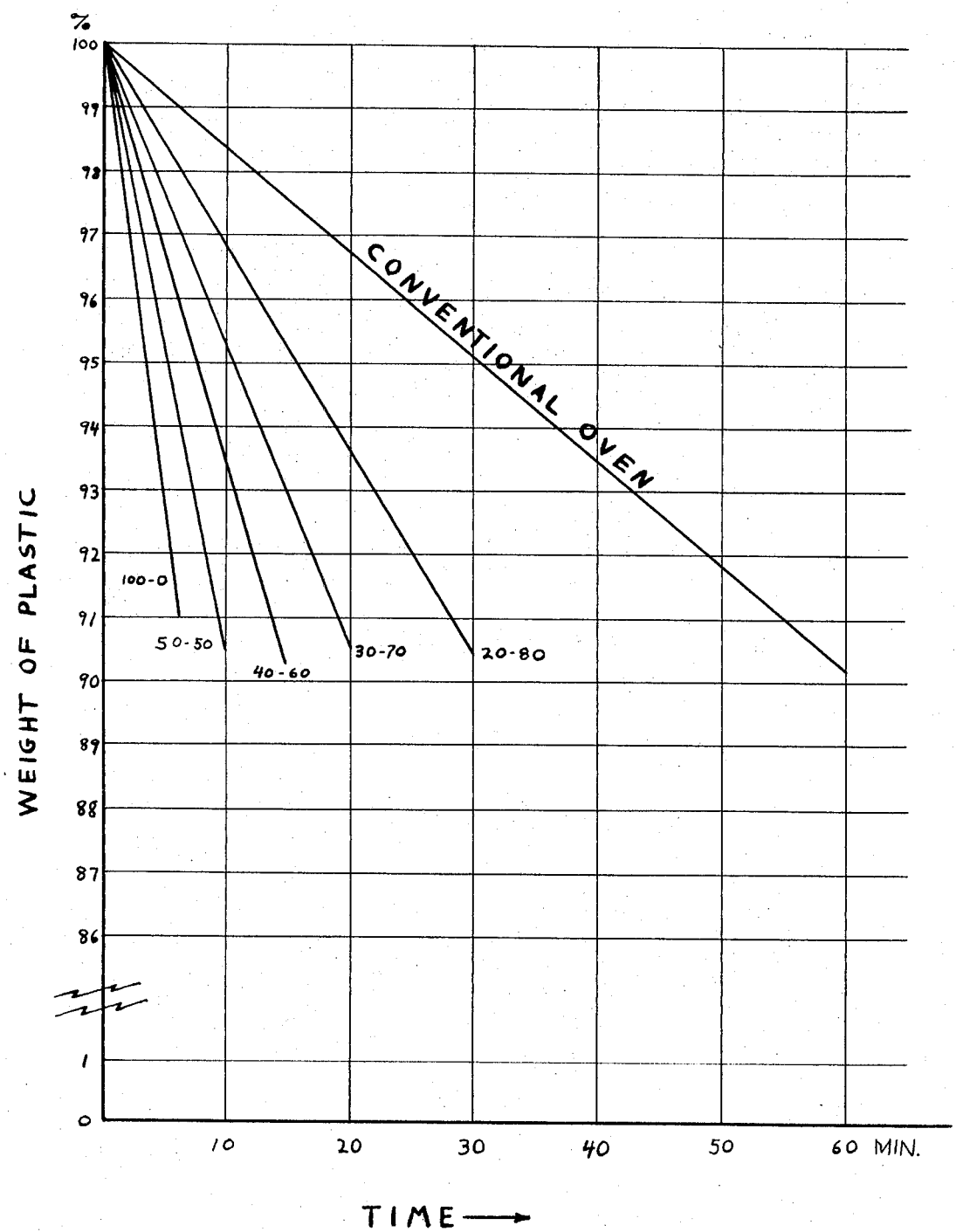

That is, the use of the partial vacuum removes surface moisture from the resin and that moisture which is within ("internal") the resin is heated by the microwave energy, diffuses out of the molecule at a rapid rate, and is then removed by the partial vacuum. The use of the microwave energy eliminates the necessity of first heating the plastic externally at a slow rate to prevent melting, and then gradually heating the plastic resin further by conventional methods to thereby heat the internal water. In fact, the microwaves interact directly with the internal moisture in the plastic resin particle approximately 10 times faster than when a conventional dryer is used for the resin and additionally the partial vacuum assists in the rapid removal of moisture which exists or is transferred to the surface of the plastic resin particles. This can clearly be seen by referring more particularly to FIG. 2. It can be seen that when a conventional oven (a dessicant bed dryer commercially available from Whitlock Corporation) is used it takes about 60 minutes to eliminate 9.5 percent of the weight of the resin plus moisture as moisture whereas the same weight loss is recorded in only 6 minutes using the microwave energy in a partial vacuum. The temperature of the conventional oven was 180° F in order to prevent melting of the resin. The "20–80" etc., refers to the duty cycle. The first figure indicates the percentage of time which the microwave oven is on and the second figure indicates the time it is off. Different duty cycles are required in order to prevent melting of the resin. The proper duty cycle can be easily determined by trial and error.

Figure 3:
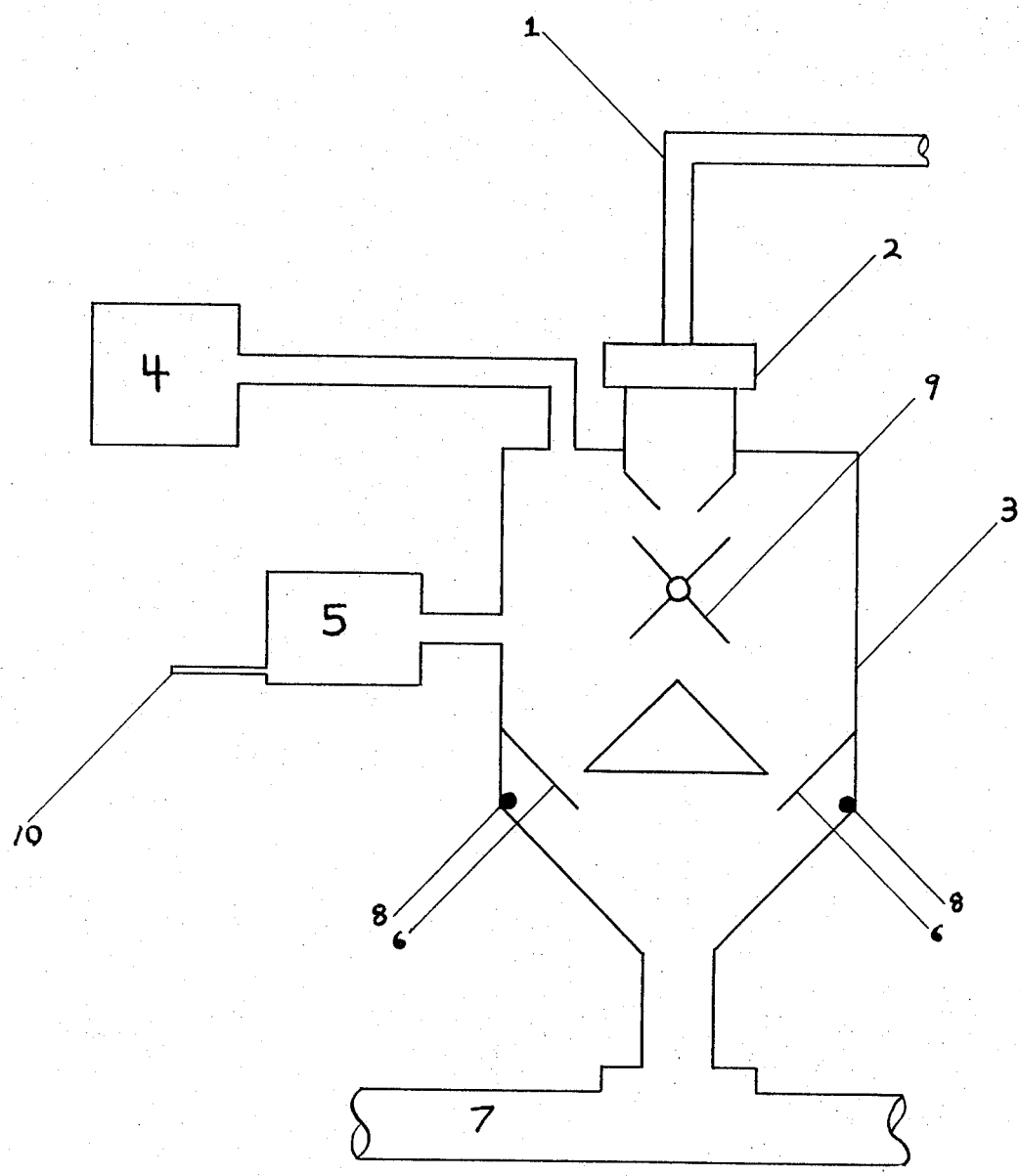
FIG. 3 shows a typical piece of apparatus useful in the method described herein.

Referring now to FIG. 3 there is shown a typical apparatus utilizing the method of using microwave energy and a partial vacuum to remove moisture from plastic resin particles which are to be used as a mold feed source. As shown in FIG. 3, the resin containing moisture is supplied via a material supply line 1 and a feed control 2 into a dryer 3. A pump assembly 4 (typically 3' × 3' × 3') is used to create a partial vacuum and microwaves are supplied to the dryer 3 via a microwave power source 5. 10 designates a conventional power input source to power the power source 5. Baffles 6 are used to control the flow of the plastic resin to the mold feed line 7. Optionally reinforcing hoops 8 may be utilized to provide additional strength to the dryer. A rotating vane 9 may also be used in the dryer to provide circulation of the resin particles to insure uniform drying and also eliminate microwave standing wave patterns. Of course, more than one set of baffles may be used as may more than one rotating vane. The apparatus which is described in FIG. 3 is typical of the apparatus which can be used in the method of this invention.

It is to be further noted that it has been found that at a temperature of only 68° F (at 1 atm.) 1 kilowatt hour (1 KWH) of power will vaporize approximately 3 lbs of water. This figure is arrived at by the following calculation:

$$H = H (\Delta T) + Hvp$$

wherein Hvp is the heat of vaporization, $H$ is the heat energy in BTUs, and $\Delta T$ is the temperature difference between the initial temperature and 212° F.

It is also well known that a resin such as ABS typically contains about 10 pounds of water per 500 pounds of resin. Thus, 1 KWH will remove 3 lbs. of water from 200 lbs. of resin, leaving about 1 lb. of water per 200 lbs. of resin or about 0.2 percent moisture in the resin. Such is quite acceptable for resins which are to be used for injection molding.

Moreover, the above figures have not been calculated taking into account the utilization of a reduced vapor pressure which the figures show produces even better results.

The following example is set forth only to show the desirability of using the present invention and is in no way intended to be limiting.

EXAMPLE

Four samples of Cycolac, an ABS resin commercially available from the Marbon Div. of Borg-Warner Corp. and each weighing 100g and taken from the same stock were tested to ascertain the best method of removing moisture therefrom. Sample 1 was placed in a vacuum at ambient temperatures and the results are set forth in FIG. 1, line 11. Sample 2 was placed in an oven at a temperature of 180° F. The results are shown in FIG. 1, line 12. Sample 3 was placed in a microwave oven as described heretofore and treated with microwave energy of 2,450 MHZ. The result is shown in FIG. 1, line 13. Sample 4 was placed in a microwave oven as described heretofore and placed into a microwave oven as described heretofore which had been adapted as shown in FIG. 3 to provide a partial vacuum. Simultaneous with the use of the microwave energy a partial vacuum was drawn so as to produce a partial vacuum of 20 mmH$_2$O. The results are set forth in FIG. 1, line 14.

Clearly, the most desirable results were obtained from the method using microwave energy and a partial vacuum.

It can therefore be seen that by following the method of the present invention, i.e., using both a partial pressure and microwaves tuned to affect only the water molecules, that it is possible to remove more moisture at a more rapid rate than was heretofore known to those skilled in the art.

It is claimed:

1. A process for drying resin particles containing moisture which comprises subjecting said resin particles to microwave energy tuned to a frequency of 2,400–2,500 MHz while subjecting said resin particles to a partial pressure of 20 inches or less H$_2$O and maintaining the molecular temperature of the moisture greater than the melting point of said resin particles.

2. The process according to claim 1 wherein said particles are 1 or less inches in thickness.

3. The process according to claim 1 wherein said particles are tumbled while being subjected to said microwave energy.

4. The process according to claim 1 wherein said resin is selected from the group consisting of polyethylene, polyvinyl chloride, polybutylenes, polyvinyl acetates, ABS resins, acrylics, cellulosics, polycarbonates, polystyrene, ethyl cellulose and nylon.

5. In a process for molding a resinous article wherein said process includes drying resin particles prior to molding said resin particles, the improvement which comprises drying said resin particles by the process of subjecting said resin particles to microwave energy tuned to a frequency of 2,400 to 2,500 MHz while subjecting said resin particles to a partial pressure of 20 inches or less H$_2$O and maintaining the molecular temperature of the moisture greater than the melting point of said resin particles.

6. The improvement according to claim 5 wherein said particles are 1 or less inches in thickness.

7. The improvement according to claim 5 wherein said particles are tumbled while being subjected to said microwave energy and said partial vacuum.

8. The improvement according to claim 5 where in said resin is selected from the group consisting of polyethylene, polyvinyl chloride, polybutylenes, polyvinyl acetates, ABS resins, acrylics, cellulosics, polycarbonates, polystyrene, ethyl cellulose and nylon.

* * * * *